United States Patent

Mita

[15] 3,653,822

[45] Apr. 4, 1972

[54] METHOD OF MANUFACTURING HYDROGEN SULFIDE AND/OR ALKALI METAL SULFATE FROM SMELTS

[72] Inventor: Akio Mita, Tokyo, Japan

[73] Assignee: Agency of Industrial Science and Technology, Tokyo, Japan

[22] Filed: June 3, 1970

[21] Appl. No.: 43,240

Related U.S. Application Data

[63] Continuation-in-part of Ser. No. 694,038, Dec. 28, 1967, abandoned.

[52] U.S. Cl. ................................. 23/121, 23/63, 23/134, 23/143, 23/181
[51] Int. Cl. ................................. C01d 5/00, C01b 17/16
[58] Field of Search ............... 23/121, 181, 143, 48, 49, 63

[56] References Cited

UNITED STATES PATENTS

| | | | |
|---|---|---|---|
| 3,414,468 | 12/1968 | Copeland | 162/30 |
| 3,020,195 | 2/1962 | Casciani et al. | 162/32 |
| 2,856,267 | 10/1958 | Kamlet | 23/181 |
| 2,215,969 | 9/1940 | Maxton | 23/224 |
| 1,834,676 | 12/1931 | Bradley et al. | 23/49 X |
| 1,754,207 | 4/1930 | Bradley et al. | 23/49 |

OTHER PUBLICATIONS

J. W. Mellor's "A Comprehensive Treatise on Inorganic and Theoretical Chem.," Vol. 10, 1930, pp. 141, 142. Longmans, Green & Co., N.Y.

*Primary Examiner*—Edward Stern
*Attorney*—Kurt Kelman

[57] ABSTRACT

An alkali metal sulfate and hydrogen sulfide of high purity are obtained by causticizing, treating with sulfuric acid, and neutralizing smelt which is obtained by concentrating and burning Na-base sulfite pulp spent liquor or neutral sulfite semi-chemical spent liquor.

1 Claims, No Drawings

METHOD OF MANUFACTURING HYDROGEN SULFIDE AND/OR ALKALI METAL SULFATE FROM SMELTS

REFERENCE TO RELATED APPLICATION

This is a continuation-in-part of my copending application Ser. No. 694,038, filed Dec. 28, 1967 and now abandoned.

BACKGROUND OF THE INVENTION

This invention relates to a method of manufacturing alkali metal sulfate and hydrogen sulfide from smelt, more particularly, to a method of manufacturing alkali metal sulfate and hydrogen sulfide at a high degree of purity by causticizing, treating with sulfuric acid and neutralizing smelt which is obtained by concentrating and burning Na-base sulfite pulp spent liquor (hereinafter referred to as "Na-base SP spent liquor") or neutral sulfite semi-chemical spent liquor (hereinafter referred to as "NSSC spent liquor").

According to a heretofore known method, Na-base NSSC spent liquor is burnt on a fluidized bed. The ash thus obtained consists mainly of sodium carbonate and sodium sulfate and further contains a large quantity of silica and, therefore, has found an extremely limited use.

When Na-base SP or NSSC spent liquor is concentrated and burnt in a reducing atmosphere, there is produced a smelt which consists mainly of sodium sulfide and sodium carbonate. Such smelt has too complicate a composition to permit recovery of industrial chemicals. Thus, it finds no demand except from manufacturers of kraft pulp and has had to be discarded. If the smelt is discarded, in its unmodified state, into a river, sodium sulfide contained therein pollutes the river water to create a problem of public nuisance.

On the other hand, alkali metal sulfate have come to find gradually expanding uses and demands in recent years. Particularly, the demand for sodium sulfate has been increasing sharply in textile, detergent and other industries, causing a shortage. Hydrogen sulfide is used as a raw material for the manufacture of sulfuric acid and sulfur. Besides this purpose, it is used for manufacturing dimethyl sulfide through reaction with dimethyl ether which is present in the waste gas emanating from methanol production plants. The insufficient supply of hydrogen sulfide has also become a serious problem.

It is an object of the present invention to provide a method of manufacturing alkali metal sulfate and hydrogen sulfide at a high degree of purity from smelt which is obtained by concentrating and burning Na-base SP or NSSC spent liquor.

SUMMARY OF THE INVENTION

This invention provides perfect treatment to Na-base SP or NSSC spent liquor which has heretofore been suffered to pollute rivers and, therefore, serves to solve the problem of public nuisance. At the same time, it can reclaim 150 – 250 kg. of alkali metal sulfates and 10 – 20 kg. of hydrogen sulfide from one ton each of pulp waste.

The inventor manufactured a smelt by subjecting wood to digestion with Na-base SP or NSSC process, concentrating the Na-base SP or NSSC spent liquor to solids concentration of 35 – 55 percent and burning the concentrated spent liquor in a reducing atmosphere.

The smelt so obtained was found to contain the components enumerated below at a rough ratio indicated.

| | |
|---|---|
| $Na_2CO_3$ | 40 – 55% |
| $Na_2S$ | 15 – 35% |
| $NaO$ | 0.5 – 1.5% |
| $Na_2SO_4$ | 3 – 17% |
| $Na_2S_2O_3$ | 1.2 – 2.5% |
| $Na_2SO_3$ | 0.5 – 3% |
| Fe | 0.1 – 0.5% |
| Al | 0.1 – 0.2% |
| $SiO_2$ | 0.1 – 0.3% |
| Insoluble residue | 0.5 – 3.5% |

The insoluble residue contained in the said smelt is removed by dissolving the smelt in water. Although the quantity of water used therefor is not limited, it is desired to be as small as permissible for the purpose of bringing the aqueous solution of sodium sulfate to a concentrated state. Specifically, it is desirable to dissolve more than 40 g. of smelt in 100 g. each of water. The smelt solution deprived of the insoluble residue (hereinafter referred to as "green liquor") is causticized with lime added thereto, whereby various water-soluble impurities such as iron and sulfate radical present in the solution are co-precipitated with calcium carbonate occurring in the course of causticization. Thus, there is produced a colorless, transparent solution essentially comprising sodium hydroxide and sodium sulfide (hereinafter referred to as "white liquor").

The quantity of lime to be added is desired to exceed 0.8 mol based on sodium carbonate contained in the green liquor. When the quantity exceeds 1.2 mols, the green liquor is perfectly causticized to afford a clear white liquor.

A similar effect is obtained by using calcium hydroxide or calcium carbide residuum ($Ca(OH)_2$ 88%, Fe 0.5%) in the place of lime. When barium hydroxide is used for this purpose, the green liquor is causticized substantially theoretically. In any case, the causticization removes more than 99 percent of iron contained in the green liquor.

When the white liquor is subsequently treated with sulfuric acid added thereto in the presence of sulfur, it generates hydrogen sulfide of a high concentration of 80 – 99 percent. Additionally, nearly all sodium silicate present in the white liquor is decomposed and removed and both sodium thiosulfate and sodium carbonate are nearly completely decomposed and removed. Consequently, the quantities of these components allowed to remain in the white liquor are even smaller than what might be termed as traces.

For the treating with sulfuric acid of the white liquor, it is sufficient to use sulfuric acid having a concentration higher than 1.0 percent. Industrially, however, it is desirable to use sulfuric acid of a concentration exceeding 30 percent from the viewpoint of heightening the concentration of the products.

The remaining mother liquor produces alkali metal sulfate when it is neutralized with sodium hydroxide, deprived quantitatively of aluminum and thereafter evaporated to dryness. The purity of resultant sulfates can be further heightened by adding hydrogen peroxide or sodium persulfate to the mother liquor while it is undergoing neutralization with sodium hydroxide.

As described above, this invention produces alkali metal sulfate and hydrogen sulfide at a high concentration by using Na-base SP or NSSC spent liquor which has been difficult of treatment and has consequently caused a problem of public nuisance. Thus, the invention is expected to prove highly effective when it is put to work in the pulp industry.

DESCRIPTION OF PREFERRED EMBODIMENTS

The following Examples are further illustrative of this invention, and it will be understood that the invention is not limited thereto. Example 1:

To 132 parts of wood were added 15.6 parts of sodium sulfite and 4.2 parts of sodium carbonate. The mixture was cooked at 170° C for 50 minutes. The cooked product was refined with a disk refiner, with a result that 100 parts of NSSC spent liquor were obtained and 415 parts of NSSC spent liquor were isolated from the pulp.

This NSSC spent liquor had solids concentration of 10 percent. The solids contained S by 8.16 percent and $Na_2O$ by 20.8 percent and had a calorific value of 3,100 cal/g.

The NSSC spent liquor was concentrated to solids concentration of 35 percent in a multiple-effect evaporator and subjected to a burning treatment in a KP type recovery boiler. Thus, 15.36 parts of smelt about 195° C in temperature were collected through the boiler bottom.

The smelt was found to have a composition of 50.6% of $Na_2CO_3$, 19.2% of $Na_2S$, 14.8% of $Na_2SO_4$, 2.62% of $Na_2S_2O_3$, 2.48% of $Na_2SO_3$, 0.63% of $Na_2SiO_3$ and 0.4% of Fe and Al.

Subsequently, 15.36 parts of the smelt were dissolved in 60 parts of water so as to remove the insoluble residue therefrom and obtain a green liquor. Then, the green liquor was causticized with 3.28 parts of lime at 95° C to afford a white liquor.

In the course of the causticization, calcium carbonate which occurred in a large quantity co-precipitated with iron and other heavy metals, to give rise to a colorless, clear white liquor.

On incorporation of 18.8 parts of 72 percent sulfuric acid, 70 parts of the white liquor reached pH 2 and emitted gaseous hydrogen sulfide (69 percent). Thus, 1.28 parts of hydrogen sulfide were obtained.

The mother liquor was filtered. The filtrate was neutralized with 0.5 parts of sodium hydroxide added thereto. By removing the precipitate of aluminum hydroxide which consequently occurred, there was obtained an aqueous solution of sodium sulfate of high purity.

This aqueous solution of sodium sulfate was distilled to liberate water and yield 20.0 parts of anhydrous sodium sulfate.

The anhydrous sodium sulfate thus obtained was found to comprise 98.5% of $Na_2SO_4$ and 10 p.p.m. of Fe.

EXAMPLE 2:

One hundred parts of pulp were obtained by cooking 250 parts of wood in the presence of Na-base SP cooking liquor (9.92 parts of $Na_2O$ and 60 parts of $SO_2$) at 140° C for 7 hours. At the same time, part of sulfur dioxide gas was collected and 1230 parts of Na-base SP spent liquor were isolated.

This Na-base SP spent liquor had solids concentration of 12 percent. The solids contained S by 8.13% and $Na_2O$ by 5.38% and had a calorific value of 4,100 cal/g.

The Na-base SP spent liquor was concentrated to 55 percent in a multiple-effect evaporator and subjected to a burning treatment in a KP type recovery boiler. Consequently, there were collected 12.76 parts of smelt about 940° C in temperature through the boiler bottom.

The smelt was found to have a composition of 48.5% of $Na_2CO_3$, 35% of $Na_2S$, 10.0% of $Na_2SO_4$, 1.5% of $Na_2S_2O_3$, 2.0% of $Na_2SO_3$, 0.2% of $Na_2SiO_3$ and 0.2% of Fe and Al.

Subsequently, 12.76 parts of the smelt were dissolved in 80 parts of water and causticized with 5.89 parts of calcium carbide residuum (8% of water, 88% of $Ca(OH)_2$ and 0.46% of Fe) at 98° C. Consequently, there was obtained a white liquor.

In the course of causticization, calcium carbonate which occurred in a large quantity co-precipitated with iron and other heavy metals to give rise to 93 parts of a clear white liquor.

Upon incorporation of 261 parts of 10% sulfuric acid, 93 parts of the white liquor reached pH 2.4 and emitted hydrogen sulfide gas (88 percent). Thus, 1.66 parts of hydrogen sulfide were collected.

The mother liquor was filtered and neutralized with 0.6 part of hydrogen peroxide. By removing the precipitate of aluminum which consequently occurred, there was obtained an aqueous solution of sodium sulfate of high purity. This aqueous solution of sodium sulfate was distilled so as to remove water and afford 18.2 parts of anhydrous sodium sulfate.

The anhydrous sodium sulfate was found to contain $Na_2SO_4$ by 99.2 percent and Fe by 4 p.p.m.

EXAMPLE 3:

To 155 parts of wood were added 18 parts of sodium sulfite and 4.5 parts of sodium carbonate. The mixture was cooked at 170° C for 60 minutes. The cooked product was refined with a disk refiner to afford 100 parts of NSSC pulp together with 517 parts of NSSC spent liquor.

This NSSC spent liquor had solids concentration of 12 percent. The solids contained S by 5.9 percent and $Na_2O$ by 14.8 parts and had a calorific value of 3,600 cal/g. The NSSC spent liquor was concentrated to 55 percent in a multiple-effect evaporator and subjected to a burning treatment in a KP type recovery boiler. Consequently, there were collected 15.5 parts of smelt about 940° C in temperature through the boiler bottom.

The smelt was found to have a composition of 51.0% of $Na_2CO_3$, 26.5% of $Na_2S$, 15.1% of $Na_2SO_4$, 2.2% of $Na_2S_2O_3$, 1.3% of $Na_2SO_3$, 0.3% of $Na_2SiO_3$, and 0.3% of Fe and Al.

Then, 15.5 parts of the smelt were dissolved in 55 parts of water to remove the insoluble residue and produce a green liquor, causticized with 15.3 parts of barium hydroxide at 100° C to afford a colorless, transparent white liquor.

Upon incorporation of 45.2 parts of 30% sulfuric acid, 72 parts of the white liquor emitted hydrogen sulfide (98 percent). Thus, 1.54 parts of hydrogen sulfide were collected.

The mother liquor was filtered and neutralized with 0.6 part of sodium persulfate. Through separation of the precipitate of aluminum which consequently occurred, there was obtained an aqueous solution of sodium sulfate of high purity. The aqueous solution was distilled so as to remove water and afford 21.0 parts of anhydrous sodium sulfate. The anhydrous sodium sulfate thus obtained was found to contain $Na_2SO_4$ by 99.5% and Fe by 3 p.p.m.

I claim:
1. A method of manufacturing sodium sulfate and gaseous hydrogen sulfide, which comprises the steps of:
   a. concentrating sulfite pulp waste liquor to a solid concentration of 35–55%;
   b. burning the concentrated liquor from Step (a) in a reducing atmosphere to form a smelt comprising sodium carbonate, sodium sulfide, sodium sulfate and sodium thiosulfate as its main components;
   c. dissolving said smelt from Step (b) in water and separating therefrom insoluble residues to obtain a green liquor containing more than 40 g. of smelt per 100 g. water;
   d. causticizing said green liquor of Step (c) with an aqueous solution of an alkaline earth metal compound, said compound being selected from the group consisting of lime, calcium hydroxide, calcium carbide residuum containing 88% $Ca(OH)_2$, and barium hydroxide to precipitate alkaline earth metal carbonate, iron and sulfate materials which are filtered out to produce a colorless white liquor essentially comprising caustic soda and sodium sulfide;
   e. combining said white liquor of Step (d) with sulfuric acid thereby generating gaseous hydrogen sulfide and a mother liquor;
   f. neutralizing said mother liquor of Step (e) with a member of the group consisting of sodium hydroxide, hydrogen peroxide and barium hydroxide;
   g. filtering the neutralized mother liquor of Step (f); and
   h. distilling the resulting aqueous solution to produce substantially pure anhydrous sodium sulfate.

* * * * *